(No Model.)
J. S. LAUDERDALE.
COTTON CHOPPER.
No. 595,397.  Patented Dec. 14, 1897.
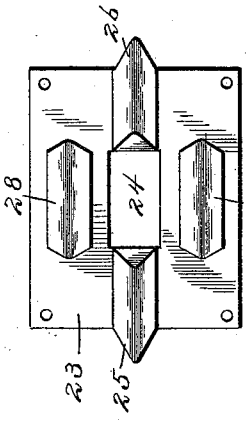
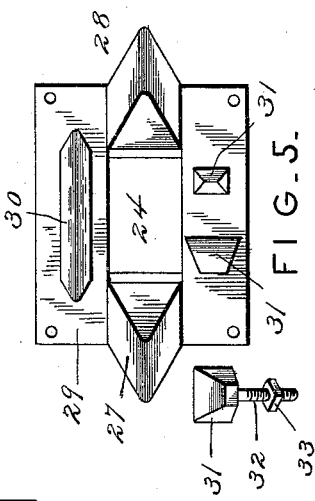
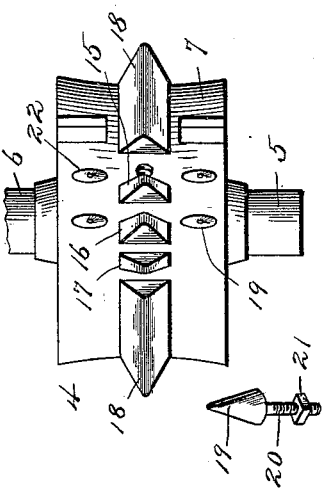
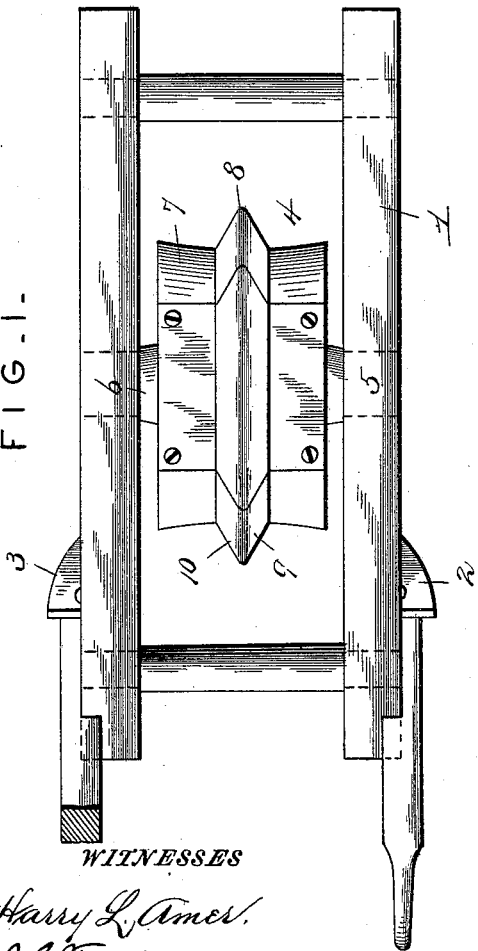
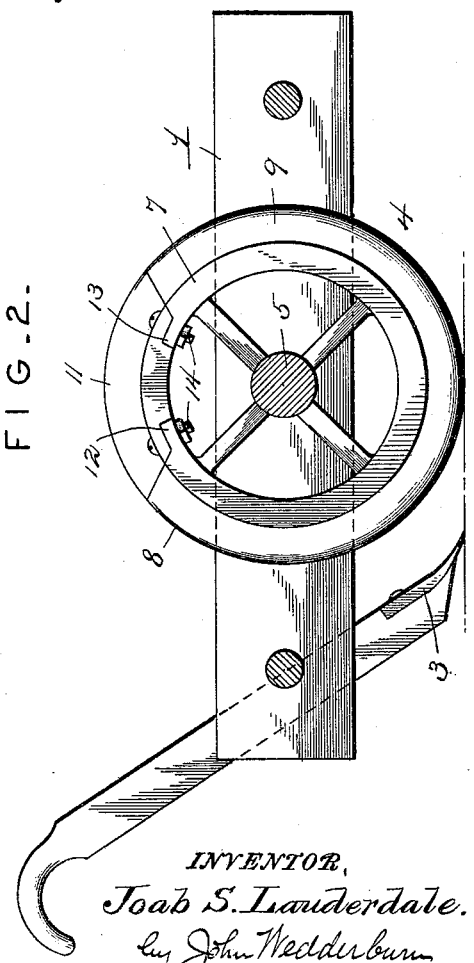
WITNESSES
Harry L. Ames
J. E. Tappan
INVENTOR,
Joab S. Lauderdale.
By John Wedderburn
Attorney

UNITED STATES PATENT OFFICE.

JOAB S. LAUDERDALE, OF KELLYTON, ALABAMA.

COTTON-CHOPPER.

SPECIFICATION forming part of Letters Patent No. 595,397, dated December 14, 1897.

Application filed August 28, 1896. Serial No. 604,167. (No model.)

*To all whom it may concern:*

Be it known that I, JOAB S. LAUDERDALE, a citizen of the United States, residing at Kellyton, in the county of Coosa and State of Alabama, have invented certain new and useful Improvements in Seed-Drills and Cotton-Choppers; and I do hereby declare the following to be a full, clear, and exact description of the invention, such as will enable others skilled in the art to which it appertains to make and use the same.

My invention relates to combined seed-drills and cotton-choppers.

My object is to provide a more simple and cheap machine which will be adapted to more perfectly drill the bed or hill and chop or thin the plants in a highly superior manner, as well as cultivating around the standing plants in such manner that they will be left slightly elevated with the dirt pressed around them.

Having this object in view my invention consists of a combined seed-drill and cotton chopper or thinner comprising certain novel features and combinations appearing more fully hereinafter.

In the accompanying drawings, Figure 1 is a plan view of my improved machine; Fig. 2, a sectional side elevation; Figs. 3 and 4, detail views of certain removable pieces; and Fig. 5, a detail plan view of the combined drill and chopping-wheel, showing certain improved features.

The numeral 1 designates the beams of an ordinary double plow, and 2 and 3 cultivating-plows of any preferred construction, which are connected to the stock at the rear end thereof on opposite sides.

The numeral 4 designates my improved combined drill-opener and chopper-wheel. This wheel is provided with suitable trunnions or journals 5 and 6, which are properly received in the beams 1. It has a broad band 7, around which extends a centrally-disposed flange 8, which may either be formed integral with the band or separate therefrom. This flange in the present instance is shown as being of substantially triangular form, having inclined sides 9 and 10; but I sometimes prefer to make it very thin or narrow and also in other shapes, which are not shown in the drawings. This flange constitutes a drill-opener, and it is also provided with improved devices whereby it may be used as a cotton chopper or thinner. The wheel is provided with one or more detachable sections 11, which rest on projecting ledges 12 and 13 of the band of the wheel, and this detachable or removable section is provided with a section of flange, so that the drill-opening flange completely encircles the wheel. This detachable section is connected to the wheel by bolts or other fastening devices 14. I sometimes prefer to dispense with the band portion of the wheel and only employ the rim, as it is not absolutely essential that the band be used, although in most instances it is desirable. The drill-opener just described is peculiarly adapted to form a straight and improved drill-opening, as the earth is packed down in a highly superior manner. The wheel is also adapted for use as a cotton-chopper. The flange can be cut away at points of the necessary distance apart for the reception of the band of the detachable cutting-teeth, or these teeth may be formed integral with the flange. Any style of teeth can be used, according to the requirements of the case, and in the present instance I have shown several varieties which are formed integral with the flange and which will now be described.

The numeral 15 designates what I shall term a "spike-tooth," which is specially adapted for use on some occasions.

The numeral 16 designates a saw-tooth, 17 a chisel-tooth, while 18 designates an ordinary blade or knife tooth. Teeth representing any of these types can be used and located on the wheel in sets at the desired distances apart in order to make the proper cuts or chops in the cotton. The flange itself crushes down those plants which are to be destroyed, together with all grass and any other foreign growth. The plows following along in the depressions or furrows between the beds open up the soil, so that it is turned over on the cut and crushed plants, so that the latter may be more perfectly destroyed. If desirable, a cutting-tooth of the type the same as that shown at 19, and which I shall designate a "flange-tooth," can be employed. This is provided with a shank 20, which freely passes through the band of the wheel and is located in a cut-away portion of the flange, and on the lower or inner end of said shank is located a nut 21. Thus it will be seen that the tooth can be adjusted to any desired angle to suit the requirements of the work. Sets of adjustable spike-teeth 22 are located in those portions of the band of the wheel which lie next the cutting-teeth of the flange, and these spike-teeth serve to assist the main teeth in cutting or chopping the cotton.

When the machine is used as a cotton-chopper, the adjustable section of the wheel, which carries a section of flange, is removed and another wheel-section substituted therefor. In the drawings I have shown two different forms of sections which are substituted when the machine is to be used as a chopper, and these will now be described in their order.

The numeral 23 designates a detachable section of the band of the wheel, which is provided with an elongated opening 24, through which the plants that are to stand pass as they are reached, and are thus saved. This plate is preferably provided with two small sections of flange 25 and 26, between which the opening is located. On either side of the opening and formed integral with the plate are two hoes 27 and 28, which are adapted to cut or loosen and at the same time press the dirt around the standing plants, as is desirable. The other plate is designated by the numeral 29, and this is also provided with an opening and two sections of the flange, and, further, it has an integral hoe 30; but in place of the remaining hoe formed on the other plate I prefer to employ a series of detachable teeth 31, which may be of any desired shape, and are provided with shanks 32 and nuts 33, so that their inclination can be varied as found desirable.

The operation of the machine may be briefly stated as follows: When it is used as a drill-opener, the flange of the wheel makes a straight drill of uniform size throughout, and the band of the wheel presses the bed around the drill-opening, while the plows following cultivate the furrows on opposite sides of the bed. When the machine is used as a chopper or thinner, the plate or wheel section commonly employed is removed and one of the chopping-sections substituted therefor. As the machine advances the teeth in alinement with the flange cut or thin the cotton, assisted by the spike-teeth at the side of the flange, while the latter presses down and crushes those plants which are not to be left standing. Certain ones of the plants pass in through the opening in the detachable plate or section and are saved, while the hoes located at the sides of said opening open up the bed and form elevations in which the row of plants is located.

It is obvious that many slight and immaterial changes might be resorted to by a skilled mechanic in carrying out my invention, and hence it is to be understood that I do not limit myself to the precise construction herein shown and described, but consider that I am entitled to all such variations as come within the spirit and scope of the invention.

Having now described my invention, what I claim as new, and desire to secure by Letters Patent, is—

1. In a combined drill-opener and cotton-chopper, the combination with a frame, of a wheel journaled therein which has a broad, flat, circular tread-band and a narrow peripherally-disposed flange located approximately intermediate the side edges of the said band and adapted to cut or open the soil.

2. In a combined drill-opener and cotton-chopper, the combination with a frame, of a wheel journaled in said frame and provided with a flange, and a series of chopping-teeth, located in alinement with the flange, adapted to cut or open the soil 3. In a combined drill-opener and cotton-chopper, the combination with the frame, of a wheel journaled in said frame which comprises a tread-band and a narrowed cutting or drill-opening flange, said wheel having a portion of its band and flange detachable from the remainder of the wheel.

In testimony whereof I have signed this specification in the presence of two subscribing witnesses.

JOAB S. LAUDERDALE.

Witnesses:
JOSEPH B. WILKINSON,
WILLIAM A. HALLOWAY.